United States Patent
Agarwal et al.

(10) Patent No.: US 10,558,559 B2
(45) Date of Patent: Feb. 11, 2020

(54) DETERMINING A TEST CONFIDENCE METRIC FOR A TESTING APPLICATION

(71) Applicant: Oracle International Corporation, Redwood Shores, CA (US)

(72) Inventors: Mayank Agarwal, Hyderabad (IN); Jagannadha Prasad Srinivas Vadlamani, Hyderabad (IN); Wendy Mui, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 15/655,095

(22) Filed: Jul. 20, 2017

(65) Prior Publication Data
US 2018/0024918 A1    Jan. 25, 2018

Related U.S. Application Data

(60) Provisional application No. 62/366,547, filed on Jul. 25, 2016.

(51) Int. Cl.
G06F 11/36 (2006.01)
G06F 3/048 (2013.01)

(52) U.S. Cl.
CPC ......... *G06F 11/3692* (2013.01); *G06F 3/048* (2013.01); *G06F 11/3676* (2013.01)

(58) Field of Classification Search
None
See application file for complete search history.

(56) References Cited

U.S. PATENT DOCUMENTS

| | | | | |
|---|---|---|---|---|
| 5,293,323 | A * | 3/1994 | Doskocil | G06F 11/2273 700/79 |
| 8,990,639 | B1 | 3/2015 | Marr et al. | |
| 9,043,658 | B1 | 5/2015 | Marr et al. | |
| 9,292,419 | B1 * | 3/2016 | Kintali | G06F 11/3676 |
| 9,354,997 | B2 | 5/2016 | Marr et al. | |
| 9,405,661 | B1 * | 8/2016 | Chirgwin | G06F 11/3672 |
| 9,838,376 | B1 | 12/2017 | Lander et al. | |
| 9,842,045 | B2 | 12/2017 | Heorhiadi et al. | |
| 2005/0198622 | A1 * | 9/2005 | Ahluwalia | G06F 11/3672 717/130 |
| 2005/0257086 | A1 * | 11/2005 | Triou, Jr. | G06F 11/3688 714/25 |
| 2006/0123389 | A1 * | 6/2006 | Kolawa | G06F 11/3616 717/101 |
| 2011/0173693 | A1 * | 7/2011 | Wysopal | G06F 11/3612 726/19 |
| 2017/0222976 | A1 * | 8/2017 | Gross | H04L 63/1416 |
| 2017/0286258 | A1 * | 10/2017 | Coulthard | G06F 11/3608 |

\* cited by examiner

*Primary Examiner* — Doon Y Chow
*Assistant Examiner* — Timothy P Duncan
(74) *Attorney, Agent, or Firm* — Invoke

(57) ABSTRACT

Techniques for calculating a test confidence metric (TCM) are disclosed. Calculating the TCM involves obtaining test results of a testing application. Calculating the TCM is based on confidence scores corresponding respectively to the test results. Calculate a confidence score for a particular test result involves identifying a failure reason for the test result, determining a weight corresponding to the failure reason, and calculating the confidence score based on the weight.

20 Claims, 9 Drawing Sheets

US 10,558,559 B2

DETERMINING A TEST CONFIDENCE METRIC FOR A TESTING APPLICATION

BENEFIT CLAIM; RELATED APPLICATION; INCORPORATION BY REFERENCE

This application claims the benefit of U.S. Provisional Patent Application 62/366,547, filed Jul. 25, 2016 and titled "Determining a Test Confidence Metric for a Testing Application," which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to testing applications. In particular, the present disclosure relates to testing application metrics.

BACKGROUND

The software development process often involves testing. The purpose of testing is to confirm that an application is functioning as intended. Software and/or hardware used to perform tests on functional code may be referred to as a "testing application."

For example, Continuous Delivery (CD) is a software development model that aims to shorten the time period between (a) the writing of updates and/or improvements to a particular software product and (b) the delivery of the updates and/or improvements to consumers of the particular software product. Many companies employing a CD model utilize a deployment pipeline and/or a delivery pipeline. The pipeline includes a set of stages through which each piece of software must pass on its way to release. The pipeline may be automated such that when one stage completes, the next stage automatically begins. If all stages are completed, the piece of software is automatically delivered to the consumers. One or more stages of the CD pipeline may include one or more testing applications, used to evaluate functional code of the software product. If a testing application does not find any problems with the functional code being tested, then the next stage of the pipeline may be initiated. The updates and/or improvements of the software product may be delivered to consumers of the particular software product. If the testing application finds a problem with the functional code, then the testing application may generate an alert. In response to the alert, a software engineer may debug and/or modify the functional code. The revised functional code may be placed into the pipeline again for testing, delivery, and/or deployment.

However, testing applications may themselves be unstable or otherwise not function as intended. In other words, it may not be possible to be confident that a testing application is producing test results that supply meaningful information about the functional code being tested by the testing application. A testing application may fail for various reasons, such as errors in the testing application's code or problems in the environment in which the testing application is running. For example, the testing environment may experience network congestion, a hardware failure, or some other type of failure not related to the functional code being tested. Accordingly, the fact that a testing application fails may not provide helpful information about the functional code being tested.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. CALCULATING A TEST CONFIDENCE METRIC
4. CALCULATING CONFIDENCE SCORES
5. TIME-DAMPING CONSTANTS
6. GRAPHICAL USER INTERFACE EXAMPLES
7. MISCELLANEOUS; EXTENSIONS
8. HARDWARE OVERVIEW
9. COMPUTER NETWORKS AND CLOUD NETWORKS
10. MICROSERVICE APPLICATIONS

1. General Overview

In an embodiment, calculating a test confidence metric (TCM) for a testing application involves obtaining test results of the testing application and calculating the TCM based on confidence scores corresponding respectively to the test results. Calculating a confidence score for a particular test result involves identifying a failure reason for the test result, determining a weight corresponding to the failure reason, and calculating the confidence score based on the weight.

In an embodiment, calculating a TCM involves determining a baseline confidence score per test result. Calculating a confidence score for a particular test result involves modifying the baseline score based on the weight corresponding to the failure reason. In an embodiment, calculating a TCM involves determining time-based damping factors corresponding respectively to the test results. Calculating a confidence score for a particular test result is based on a corresponding time-based damping factor. In an embodiment, calculating another confidence score involves determining that a test result indicates a pass condition of the testing application, determining a weight corresponding to the pass condition, and calculating the confidence score based on the weight.

One or more embodiments described in this Specification and/or recited in the claims may not be included in this General Overview section.

2. Architectural Overview

Figure 1:
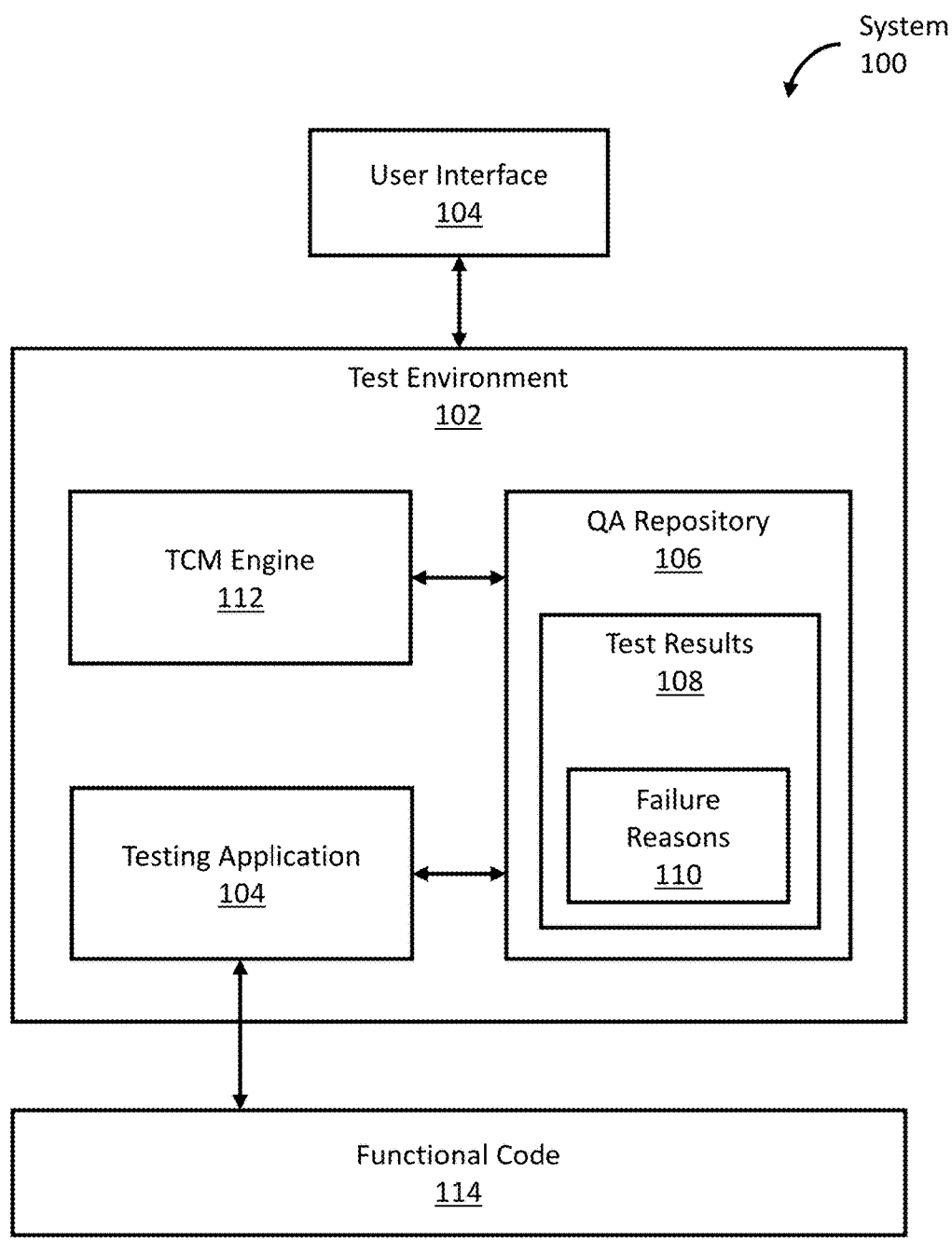
FIG. 1 is a block diagram illustrating a system in accordance with an embodiment.

FIG. 1 is a block diagram illustrating a system 100 in accordance with an embodiment. As illustrated in FIG. 1, system 100 includes a test environment 102 including a testing application 104, a quality assurance (QA) repository 106 storing test results 108 and failure reasons 110, and a test confidence metric (TCM) engine 112. The system 100 further includes a user interface 104 for the test environment 102. The system 100 further includes functional code 114 to be tested. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 9, titled "Computer Networks and Cloud Networks."

In an embodiment, the functional code 114 is considered "functional" because it includes product functionality that is subject to testing prior to deployment. The functional code 114 may be implemented in many different ways. For example, the functional code 114 may include code designed in an object-oriented programming language, a functional language, a procedural language, bytecode, assembly code, firmware, field programmable gate arrays (FPGAs), and/or any other type of code implemented in hardware and/or software. The functional code 114 may include compiled code, i.e., software code that has been compiled to machine-executable instructions. Alternatively or in addition, the functional code 114 may include uncompiled code. The functional code 114 may include multiple types of code and may be distributed across multiple nodes. The functional code 114 may include code that is not yet "live," i.e., code that has not yet been released as part of a software product. Alternatively or in addition, the functional code 114 may include live code, i.e., code that is executing in a so-called "live" or "production" environment.

In an embodiment, the test environment 102 includes functionality for testing the functional code 114. A testing application 104 is a tool, or set of tools, used to evaluate one or more features of the functional code 114, to determine whether the feature(s) function as intended by the developer(s). For example, a testing application 104 may be used to test a particular set of logic in the functional code 114, to determine whether the logic yields an expected result under certain conditions. As another example, a testing application 104 may be used to test security features of the functional code 114, to determine whether the functional code 114 properly enforces security settings. As another example, a testing application 104 may be used to test communications functionality of the functional code 114, to determine whether messages are transmitted to, from, and/or within the functional code 114 as expected. As another example, a testing application 104 may include one or more stress tests, to determine how the functional code 114 operates when exposed to excessive conditions. Excessive conditions may include, for example, excessive amounts of input data, a large number of users, low bandwidth, low CPU availability, etc. As another example, a testing application 104 may be used to test deployment of the functional code 114 into a particular software and/or hardware environment. As another example, a testing application 104 may be used to determine how the functional code 114 operates in response to unexpected input. Unexpected input may include, for example, Structured Query Language (SQL) injection attempts, null or zero values, data of an unexpected type, malformed data, corrupt data, etc. As another example, a testing application 104 may be used for regression testing, i.e., to confirm that previous repaired errors (or "bugs") in the functional code 114 have not resurfaced. Many different types of tests may be performed using a testing application 104, and this list should not be considered limiting or exhaustive. The testing environment 102 may include any number of testing applications.

In an embodiment, a testing application 104 is a manual testing application, meaning that it requires input from a human operator throughout the testing process. For example, a testing application 104 may require a QA analyst to manually input data, navigate through a user interface, etc. Alternatively, a testing application 104 may be an automated testing application, meaning that once the testing application 104 is configured, it requires little or no input from a human operator. For example, a testing application 104 may automatically submit different types of input to the functional code 114. A testing application 104 may include a combination of manual and automated testing features.

In an embodiment, a QA repository 106 stores test results 108. The QA repository 106 may be any type of storage unit and/or device (e.g., a file system, database, collection of tables, or any other storage mechanism) for storing data. Further, the QA repository 106 may include multiple different storage units and/or devices. The multiple different storage units and/or devices may or may not be of the same type or located at the same physical site. Further, the QA repository 106 may be implemented or may execute on the same computing system as one or more other elements of the system 100, such as the TCM engine 112, testing application 114, user interface 104, and/or functional code 114. Alternatively or additionally, the QA repository 106 may be implemented or executed on a computing system separate from one or more other elements of the system 100. The QA repository 106 may be communicatively coupled to one or more other elements of the system 100 via a direct connection or via a network.

In an embodiment, the test results 108 are results of multiple instances of using the testing application 104 to test the functional code 114. Each instance of using the testing application 104 to test the functional code 114 may be referred to as a "run" of the testing application 104. For example, if the testing application 104 has been run one hundred times, the QA repository 106 may include one hundred test results 108, with each test result corresponding to a different run of the testing application 104.

In an embodiment, the test results 108 include failure reasons 110. Specifically, if one or more of the test results 108 indicate that one or more runs of the testing application 104 resulted in a failure condition, the failure reasons 110 may indicate one or more reasons for the failure(s). The failure reasons 110 may be stored in a same data structure or other storage location as the test results 108, as illustrated in FIG. 1, or may be stored in a different location. A particular run of a testing application 104 may fail for many different reasons, which may be stored in the failure reasons 110. For example, a run of a testing application 104 may fail due to errors in the code of the testing application 104 itself. As another example, a run of a testing application 104 may fail due to a problem in the test environment 102. A problem in the test environment 102, may include, for example, network congestion, a hardware failure, or some other type of failure not related to the functional code 114 being tested. As another example, a run of a testing application 104 may fail due to a problem in the functional code 114. A problem in the functional code 114 may include, for example, a logic error or misconfiguration. Many different types of problems may cause a particular run of a testing application 104 to fail, and this list should not be construed as limiting or exhaustive. In an embodiment, the intended purpose of the testing application 104 is to identify problems in the functional code 114 itself.

In an embodiment, the test results 108 are entered into the QA repository 106 manually, by a QA analyst. For example, a QA analyst may run the testing application 104, determine whether the run succeeded or failed, and enter corresponding test results 108 into the QA repository 106. Alternatively or in addition, if the testing application 104 includes automated features, the testing application 104 may automatically store test results 108 in the QA repository 106, i.e., without requiring a human operator to enter the test results 108. A combination of manual and automated entry of test results 108 may be used.

In one or more embodiments, the user interface 104 refers to hardware and/or software configured to facilitate communications between a user and elements of the test environment 102, such as the TCM engine 112, the QA repository 106, and/or the testing application 104. The user interface 104 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Examples of user interfaces are described in detail below.

In an embodiment, different components of the user interface 104 are specified in different languages. The behavior of user interface elements is specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively or in addition, components of the user interface 104 may be specified in one or more other languages, such as Java, C, or C++.

In one or more embodiments, the TCM engine 112 refers to hardware and/or software configured to perform operations described herein for generating a test confidence metric. Specifically, the TCM engine 112 may be configured to use test results 108 from the QA repository 106 to generate a test confidence metric for the testing application 104. Examples of operations for generating a test confidence metric are described below.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Calculating a Test Confidence Metric

Figure 2:
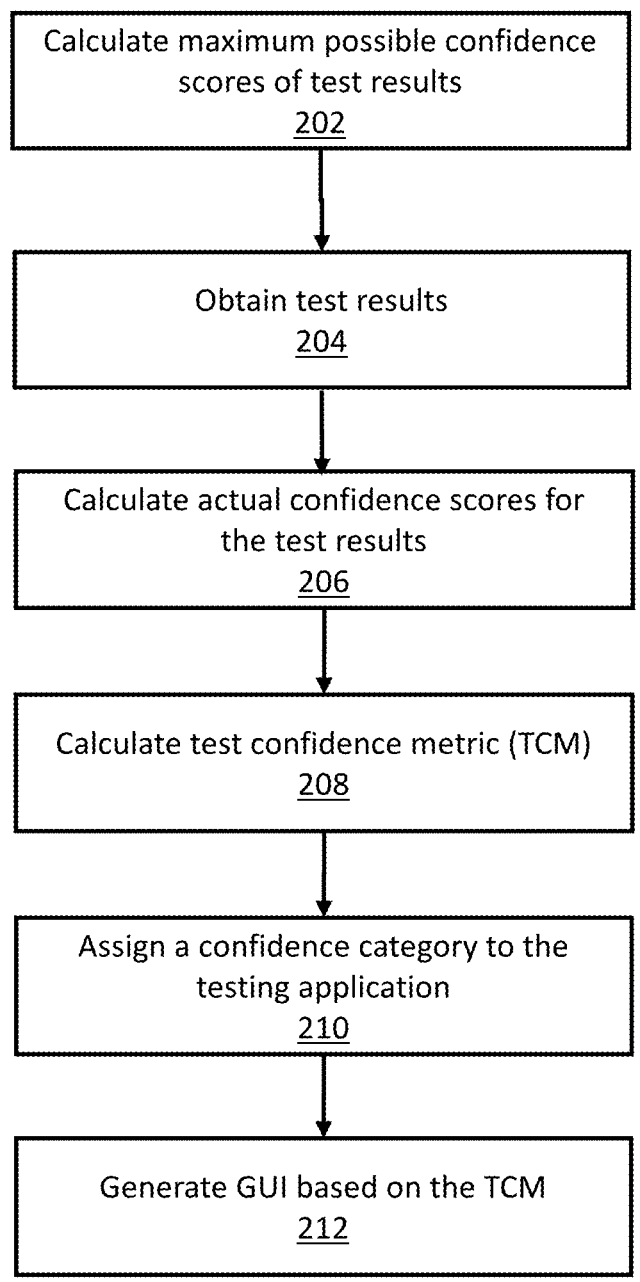
FIG. 2 illustrates a set of operations for calculating a test confidence metric in accordance with an embodiment.

FIG. 2 illustrates an example set of operations for generating a test confidence metric (TCM) in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. In an embodiment, operations for generating a TCM are performed by a TCM engine, such as the TCM engine 112 illustrated in FIG. 1.

In an embodiment, calculating a TCM involves calculating confidence scores for multiple test results. The TCM is based, at least in part, on the combined confidence scores for the test results. As discussed below, each confidence score indicates a level of "confidence" in the corresponding test result. Specifically, a higher confidence score may indicate a higher confidence that the test result provides useful information about the functional code being tested. For example, a higher confidence score may be assigned when a failure occurs for a reason the testing application is designed to detect, and a lower confidence score may be assigned when a failure occurs for a reason the testing application is not designed to detect. Different types of confidence scores are discussed in further detail below.

In an embodiment, the TCM engine calculates maximum possible confidence scores of test results (Operation 202). Calculating maximum possible confidence scores may involve calculating a theoretical maximum, assuming the highest possible confidence in each test result. For example, the maximum possible confidence score for a test result may assume that the test result indicates a pass condition of the testing application, i.e., that a run of the testing application completed successfully ("passed") without identifying any problems.

In an embodiment, the maximum possible confidence score for a particular test result is a baseline confidence score adjusted by a time-based damping factor. The baseline confidence score may be calculated so that all the baseline confidence scores for the test results add up to one hundred (100). For example, if the TCM is to be based on confidence scores for fifty (50) test results, the baseline confidence score may be calculated as 100 divided by 50=2. In this example, the baseline confidence score for each test result is 2. Similarly, if the TCM is to be based on confidence scores for thirty (30) test results, the baseline confidence score may be calculated as 100 divided by 30=3.33. These calculations are provided as examples only.

In an embodiment, the time-based damping factor is used to give more recent test results higher weight in the TCM that older test results. In other words, it may be assumed that more recent test results are more reliable, informative, or otherwise provide more "confidence" than older test results. The time-based damping factor may be calculated as a function of a time-based damping constant, raised to a power corresponding to the relative position of the particular test result. For example, given a time-based damping constant C, the time-based damping factor for a particular test result may be calculated as a function of $C^n$, where n is a number corresponding to the relative position of the test result. For example, n may reflect a numbered ordering of the test results. Alternatively or in addition, n may be a function of how recently the test result was determined using the testing application. In an embodiment, n starts at zero (0) for the most recent test result and increments by one for each previous test result, ordered from newest to oldest.

In an embodiment, referring to the discussion of baseline confidence scores and time-based damping factors above, the maximum possible confidence score M for a particular test result is calculated as follows, where B is the baseline confidence score, c is the time-based damping constant, and n is a number corresponding to the relative position of the test result:

$$M = B * \frac{1}{C^n}$$

In an embodiment, the total M for multiple test results is the sum of M for each individual test result. Thus, the total M for five (5) test results may be calculated as follows:

$$M = B * \frac{1}{C^0} + B * \frac{1}{C^1} + B * \frac{1}{C^2} + B * \frac{1}{C^3} + B * \frac{1}{C^4}$$

In general, for a total number of test results N, the formula for M described above may be expressed as follows:

$$M = B * \left( \frac{C^N - 1}{C^{N-1} * (C - 1)} \right)$$

Thus, in an embodiment, calculating maximum possible test scores of test results (Operation 202) involves determining the number of test results and obtaining a time-based damping constant. From the number of test results, a baseline confidence score for each test result may be determined. A formula for M, such as the one described above, may be applied to the baseline confidence score and the time-based damping constant, to determine the maximum possible test scores.

In an embodiment, baseline confidence scores are not used. If baseline confidence scores are used, they may be calculated in a different manner than described above. For example, baseline confidence scores may correspond to a constant value that does not change based on the number of test results used. Many different types of calculations may be used. Alternatively or in addition, time-based damping factors may not be used. If time-based damping factors are used, they may be calculated in a different manner than described above. For example, time-based damping factors may correspond to a series of numbers that are not based on an underlying constant. Many different types of calculations may be used. Embodiments should not be considered limited to the specific calculations described above.

In an embodiment, the TCM engine obtains test results (Operation 204). Specifically, the TCM engine may query a QA database (e.g., QA database 106 of FIG. 1). Alternatively or in addition, the TCM engine may receive test results in a message, such as a message received via a representational state transfer (REST) application programming interface (API). The TCM engine may obtain test results in many different ways or a combination of different ways. In an embodiment, the test results include failure reasons for test results that indicate a failure condition of a testing application. The TCM engine may obtain no more than a particular number of test results. For example, if the TCM engine is configured to calculate a TCM based on 100 test results, the TCM engine may obtain the 100 most recent test results for a particular testing application. Alternatively, the TCM may sample a particular number of test results at random, from the test results available for a particular testing application. Many different criteria may be used to determine which test results to obtain.

In an embodiment, the TCM engine calculates actual confidence scores for the test results (Operation 206). Calculating actual confidence scores is discussed in detail below. The TCM engine calculates a TCM based on the actual confidence scores (Operation 208). In an embodiment, calculating the TCM involves adding up all the actual confidence scores for the test results and expressing the sum as a percentage of the maximum possible confidence scores for the test results. For example, if the maximum possible confidence score for one hundred test results were 500 and the sum of actual confidence scores for the test results were 290, the TCM may be expressed as 58 percent, because 290 is 58 percent of 500. In general, in an embodiment, the TCM is calculated as follows, with M being the sum of maximum possible confidence scores and A being the sum of actual confidence scores.

$$TCM = \left( \frac{A}{M} \right) * 100$$

The formula above is provided as an example only. A TCM may be calculated in many different ways. For example, a TCM may be expressed as a numerical value that is not a percentage. Alternatively or in addition, a TCM may not be a function of maximum possible confidence scores. Alternatively or in addition, a TCM may be calculated using a formula that incorporates one or more factors not discussed above. Embodiments should not be considered limited by the specific formula shown above.

In an embodiment, the TCM engine assigns a confidence category to the testing application (Operation 210), based on the corresponding TCM calculated by the TCM engine. A confidence category is a number or phrase indicating, at a high level, a general confidence level attributed to the testing application. A testing application with a TCM in a particular range may be assigned a particular confidence category. For example, the TCM engine may assign a confidence category of "unhealthy" to any testing application with a TCM below a certain amount, such as 50 percent. As another example, the TCM engine may assign a confidence category of "review candidate" for any testing application with a TCM between 50 percent and 70 percent. As another example, a TCM engine may assign a confidence category of "stable" to any testing application with a TCM above 70 percent. Many different confidence categories may be assigned, based on many different criteria.

In an embodiment, the TCM engine generates a graphical user interface (GUI) based on the TCM (Operation 212). The GUI may be based on a single TCM or multiple TCMs. The GUI may be based on TCM data for a single testing application or multiple testing applications. Examples of a GUI presenting TCM data are discussed in detail below.

In an embodiment, the TCM engine compares the TCM to a threshold value (not shown). If the TCM is below the threshold value, the TCM engine may generate an alert to notify a software developer that the particular testing application is unhealthy, i.e., unreliable for its intended purpose. In response to the alert, the software developer may debug and/or modify the particular testing application to increase the accuracy of the particular testing application.

Additionally or alternatively, if the TCM is below the threshold value, the TCM engine may remove the particular testing application from a delivery pipeline and/or deployment pipeline that is used in a CD model. Failures detected by the particular testing application may be ignored during the deployment process. Functional code may be deployed through the pipeline, without passing a test executed by the particular testing application.

4. Calculating Confidence Scores

Figure 3:
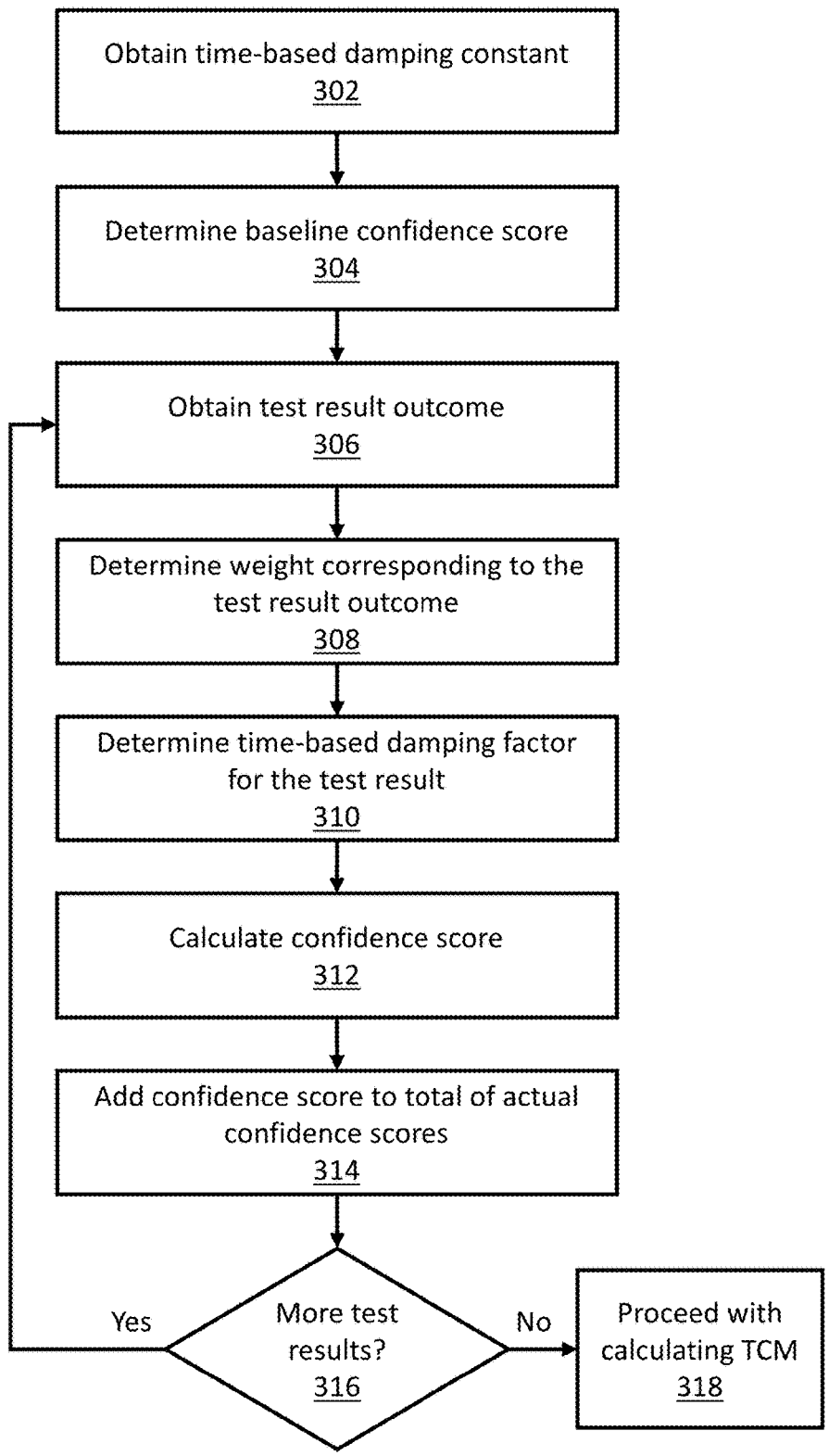
FIG. 3 illustrates a set of operations for calculating confidence scores in accordance with an embodiment.

FIG. 3 illustrates an example set of operations for calculating confidence scores in accordance with one or more embodiments. Specifically, FIG. 3 illustrates an example set of operations for calculating confidence scores corresponding, respectively, to each of multiple test results. The confidence scores may be used to calculated a TCM, as discussed above. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, the TCM engine obtains a time-based damping constant (Operation 302). Alternatively or in addition, the TCM engine may determine a baseline confidence score (Operation 304), for each test result. The time-based damping constant and/or baseline confidence score may be obtained or determined in the process of calculating maximum possible confidence scores, as discussed above.

In an embodiment, the TCM engine obtains a test result outcome (Operation 306). Specifically, for a particular test result, the TCM engine determines a corresponding outcome. For example, the outcome of a test result may indicate a pass condition or a fail condition. For a fail condition, obtaining the test result outcome may involve determining a reason for the failure. In an embodiment, the TCM engine obtains test result outcomes from most recent to least recent.

In an embodiment, the TCM engine determines a weight corresponding to the test result outcome (308). Specifically, the weight indicates a particular confidence level attributable to the test result, based on the test result outcome. For example, a test result outcome indicating that the testing application passed may be assigned a high weight, corresponding to high confidence. A test result outcome indicating that the testing application failed may also be assigned a high weight, if the failure reason is associated with a problem in the functional code being tested. Failing due to a problem in the functional code is consistent with the intended purpose of the testing application. However, a test result outcome indicating that the testing application failed for a reason not related to the functional code may be assigned a lower weight, indicating lower confidence in the testing application. Alternatively or in addition, one failure reason indicating a problem with the testing application may be given a lower weight than another failure reason indicating a problem with the testing application. For example, a failure reason indicating a hardware failure may be assigned a higher weight than a failure reason indicating a logic error in the testing application, because a hardware error may not indicate that the testing application itself is unreliable. In other words, a higher weight may be used for a failure the testing application is designed to detect than for a failure the testing application is not designed to detect. For example, a pass condition or a failure condition associated with a problem in the functional code may be assigned a weight of 1.0; a failure condition associated with a problem in the testing environment (other than a problem with the testing application itself) may be assigned a weight of 0.5, and a failure condition associated with a problem in the testing application itself may be assigned a weight of 0. If the testing result outcome indicates that the testing application failed for an unknown reason, the TCM engine may assign a weight corresponding to a problem in the functional code. Alternatively, if the testing result outcome indicates that the testing application failed for an unknown reason, the TCM engine may assign a weight corresponding to a problem in the testing application. Alternatively, the TCM engine may disregard test results when the failure reason is unknown.

In an embodiment, the TCM engine determines a time-based damping factor for the test result (Operation 310). As discussed above, the time-based damping factor may be a function of a time-based damping constant and/or the test result's recentness relative to other test results. In an embodiment, the TCM engine calculates the time-based damping factor t for a particular test result as a function of a time-based damping constant T and a number n corresponding to the test result's relative position, as follows:

$$t = \frac{1}{T^n}$$

A time-based damping factor may be calculated in many different ways, and embodiments should not be considered limited to the specific formula shown above.

In an embodiment, the TCM engine calculates a confidence score (Operation 312) for the test result. Specifically, the TCM engine may calculate the confidence score as a function of the baseline confidence score, weight assigned to the test result outcome, and/or a time-based damping factor. In an embodiment, the confidence score is calculated as follows, where S is the confidence score, B is the baseline confidence score, w is the weight, and t is the time-based damping factor for the test result.

$$S = B * w * \frac{1}{t}$$

A confidence score for a test result may be calculated in many different ways, and embodiments should not be considered limited to the specific formula shown above.

In an embodiment, a TCM for a testing application is based on a sum of actual confidence scores for the test results. Accordingly, the TCM application may add the confidence score to a total of actual confidence scores (Operation 314). Alternatively, the TCM may be calculated based on an average of the confidence scores. Confidence scores for multiple test results may be combined in many different ways to calculate a TCM.

In an embodiment, the TCM engine determines if there are more test results (Operation 316) for which to calculate confidence scores. If there is another test result for which to calculate a confidence score, the TCM engine may proceed to do so (Operation 306). If there are no more test results, the TCM engine may proceed with calculating the TCM (318), based on the confidence scores calculated by the TCM.

5. Time-Based Damping Constants

Figure 4:
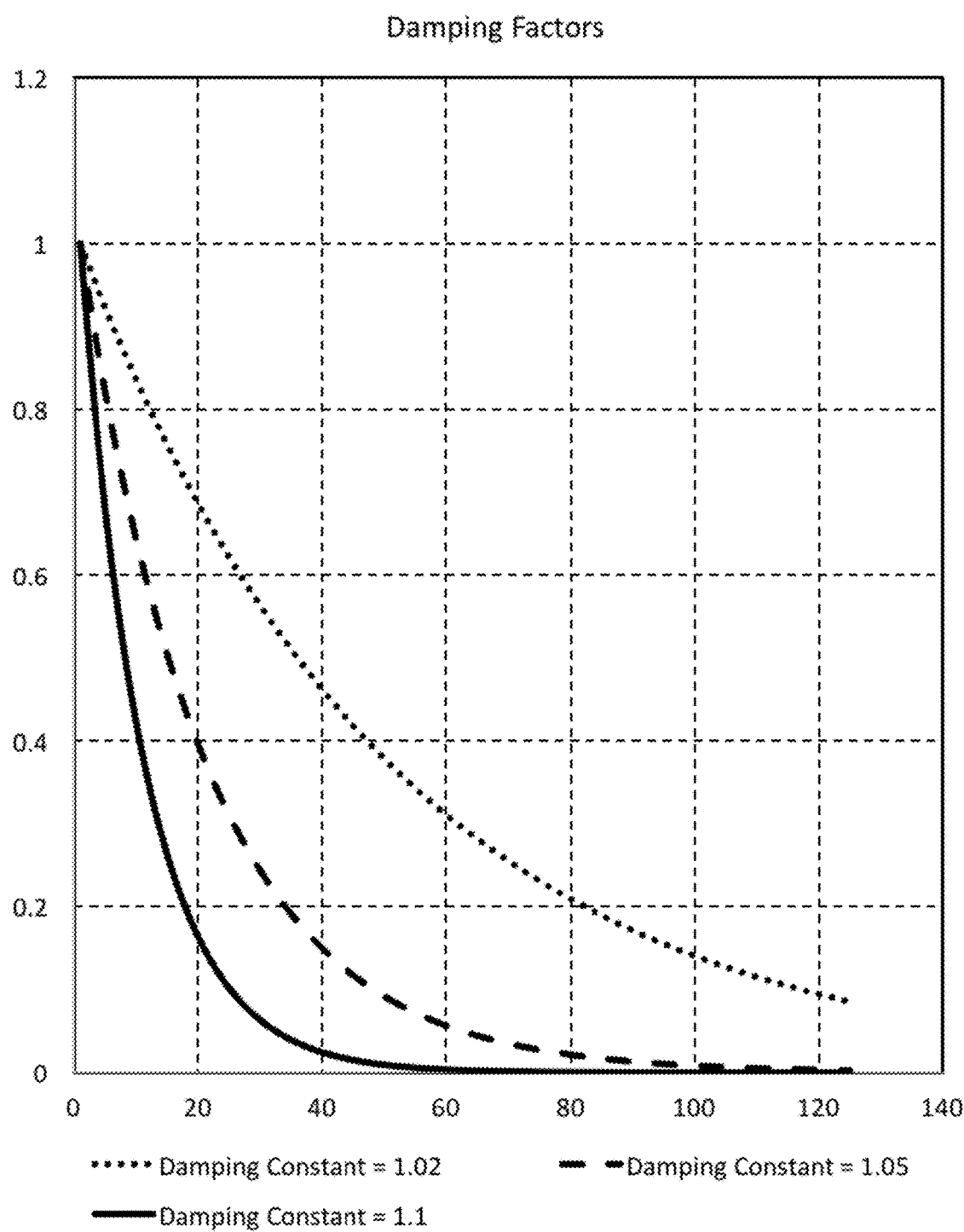
FIG. 4 illustrates examples of time-based damping constants in accordance with an embodiment.

FIG. 4 illustrates examples of time-based damping constants in accordance with an embodiment. Specifically, FIG. 4 illustrates differences in time-based damping factors over a series of runs of a testing application, for three different examples of time-based damping constants. In this example, each time-based damping factor t is graphed as a function of the corresponding time-based damping constant T and a number n corresponding to the test result's relative position, as follows:

$$t = \frac{1}{T^n}$$

Further, in this example, n starts at zero (0) for the most recent run of the testing application and increments by one (1) for successive test results, ordered from newest to oldest. Thus, regardless of the time-based damping constant, t evaluates as 1 for the most recent testing result. Further, as illustrated in FIG. 4, using a larger time-based damping constant results in older test results being weighted less than if a smaller time-based damping constant is used. For example, when a time-based damping constant of 1.05 is used, nearly zero weight is given beyond the sixtieth test result (i.e., the sixtieth most recent). When a time-based damping constant of 1.02 is used, nearly zero weight is given beyond the hundredth test result (i.e., the hundredth most recent). When a time-based damping constant of 1.1 is used, the time-based damping factor for the one hundred twentieth test result is still around 0.1, giving that test result more weight than if a larger time-based damping constant is used.

6. Graphical User Interface Examples

FIGS. 5A-5E illustrate diagrams of a graphical user interface (GUI) 500 in accordance with an embodiment. Embodiments may include more or fewer elements than those shown FIGS. 5A-5E. Elements may be arranged differently than what is shown in FIGS. 5A-5E. An element illustrated as being implemented using a particular type of widget in Figures SA-SE may be implemented using a different type of widget. For example, a widget illustrated as a dropdown menu may instead be implemented as a list of hyperlinks. Accordingly, embodiments should not be considered limited to the specific examples shown in FIGS. 5A-5E.

Figure 5A:
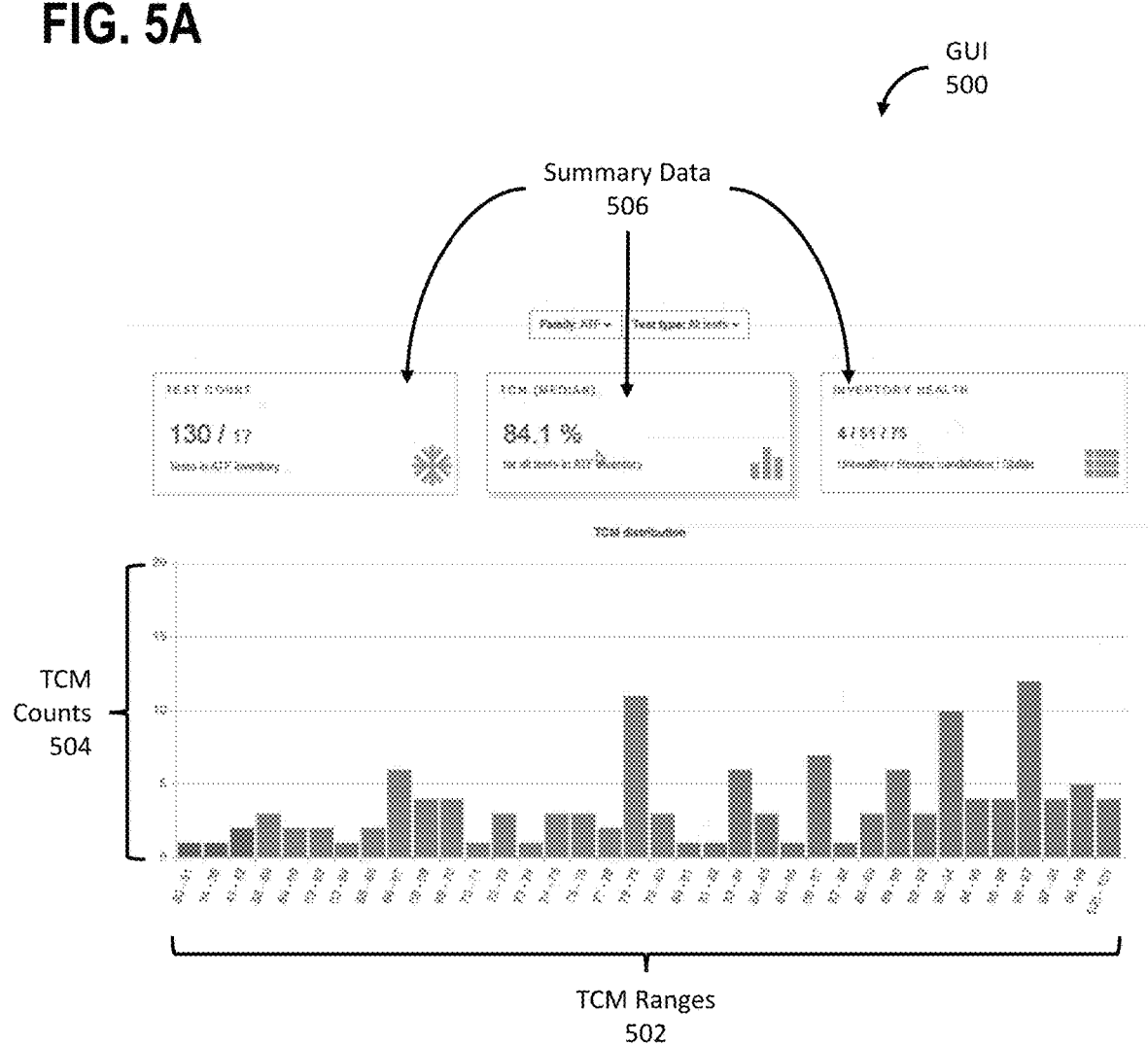
FIGS. 5A-5E illustrate diagrams of a graphical user interface in accordance with an embodiment.

As illustrated in FIG. 5A, the GUI 500 may represent TCMs for one or more testing applications in a distribution chart. Specifically, each section of the distribution chart may indicate the number of TCMs in a particular range. For example, in FIG. 5A, TCMs are grouped in TCM ranges 502, with a bar graph representing the TCM counts 504, i.e., the number of TCMs in each range. In this example, there are more TCMs having a value of 96 or 97 than in any other TCM range.

Alternatively or in addition, the GUI 500 may include summary data 506. Summary data is information that summarizes one or more TCMs. For example, in FIG. 5A, the summary data 506 shows the total number of tests (i.e., testing applications), a median TCM for the TCMs shown (84.1% in this example), and the number of TCMs that have been assigned different confidence categories ("unhealthy," "review candidates," and "stable," in this example).

Figure 5B:
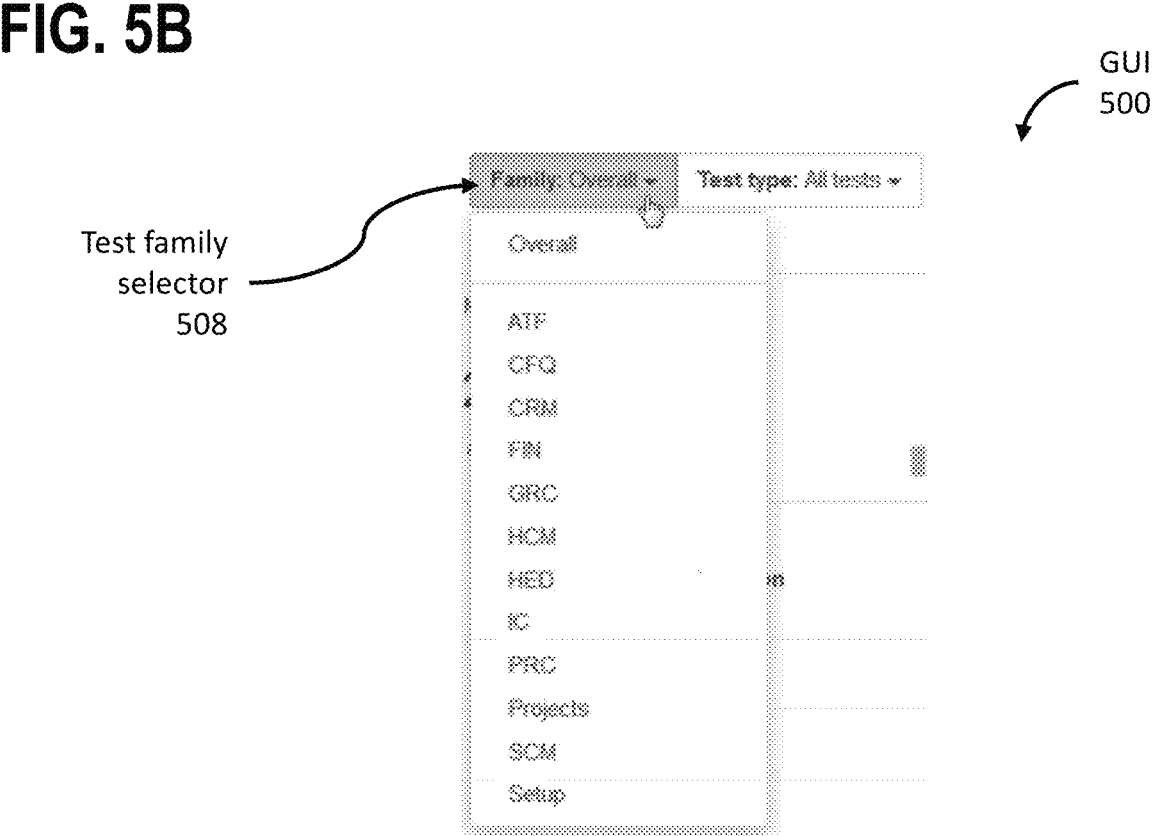
Figure 5C:
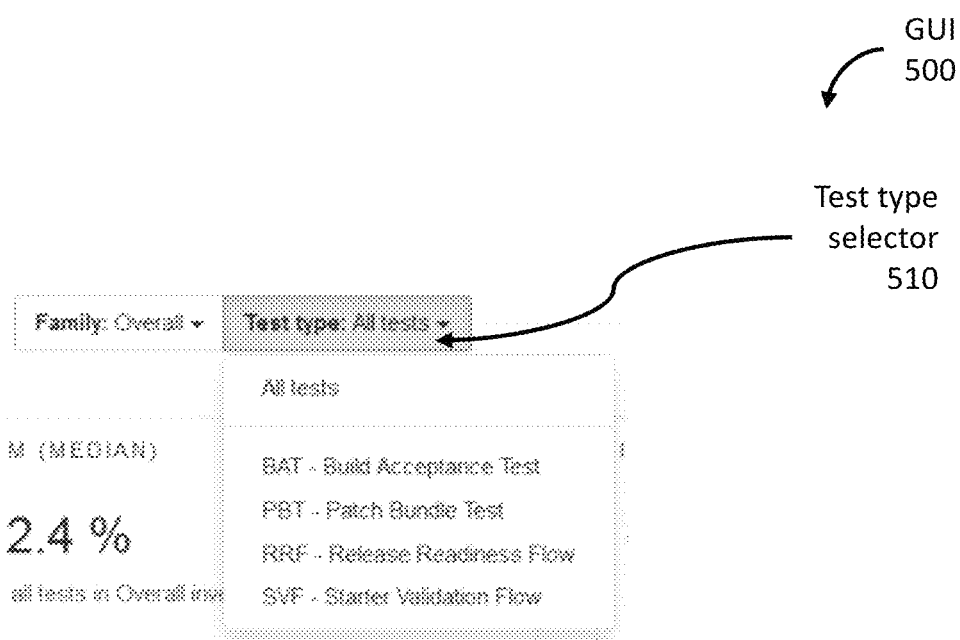

As shown in FIG. 5B, the GUI 500 may include controls for selecting which TCMs to visualize. For example, the GUI 500 may include a test family selector 508. The test family selector 508 may be used to select a "family," or logical grouping, of testing applications. For example, testing applications may be grouped in families according to the functional code each testing application is designed to test. A testing application used to test a customer relationship management (CRM) application may be in a different family than a testing application used to test a database application, for example. As shown in FIG. 5C, the GUI 500 may include a test type selector 510. The test type selector 510 may be used to select testing applications of a specific type. For example, as illustrated in FIG. 5C, build acceptance tests, patch bundle tests, release readiness flow tests, and starter validation flow tests are different types of tests. A test family selector 508 and/or test type selector 510 may be used to cause the GUI 500 to display TCM data associated only with the particular family and/or type of test selected.

Figure 5D:
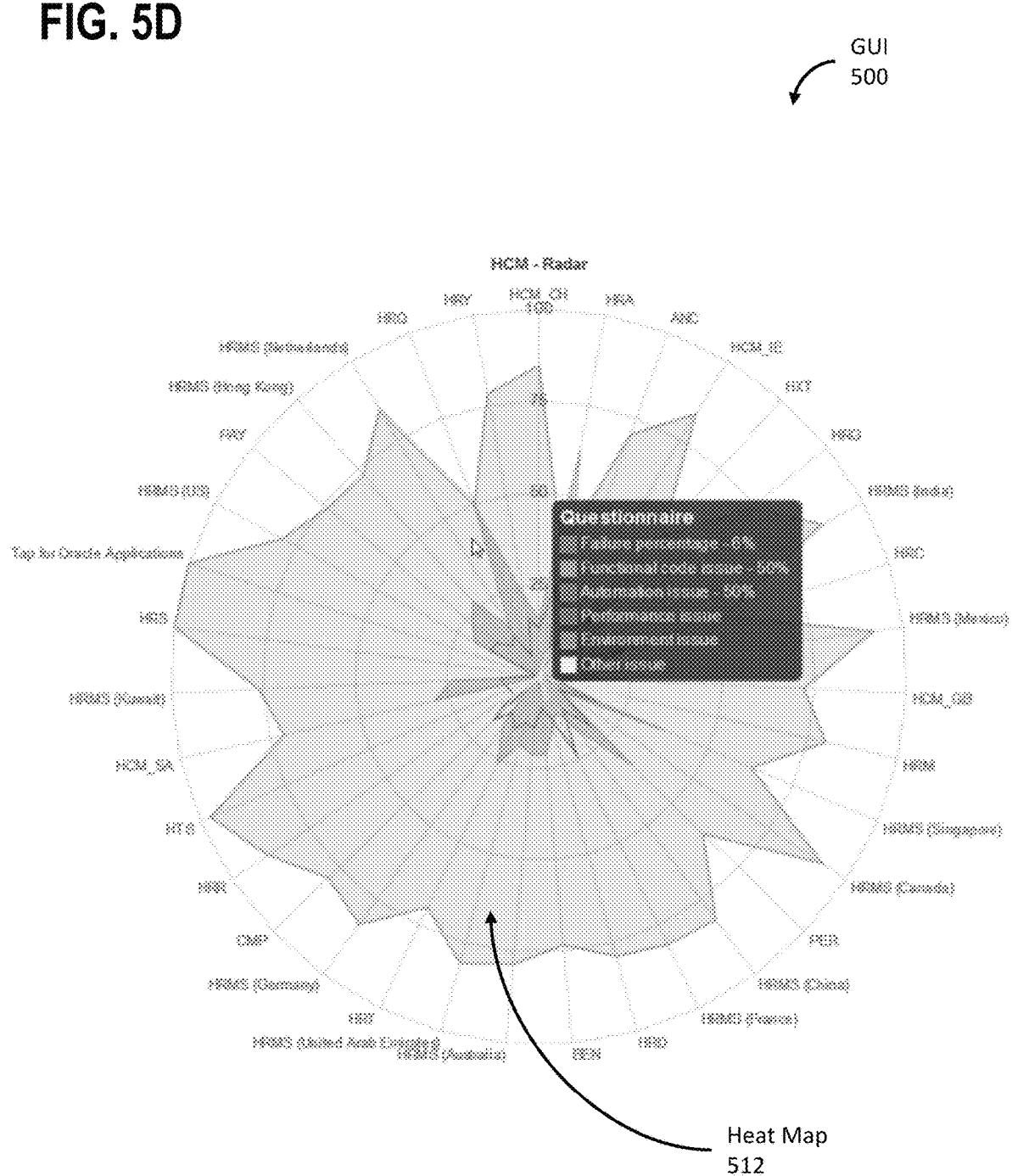

As shown in FIG. 5D, the GUI 500 may include different ways of visualizing TCMs for different testing applications. For example, in FIG. 5D, TCMs are represented in a radar, or heat map, format. In this example, the TCM for each testing application is represented by the magnitude of the heat map along the corresponding vector from the center of the heat map. In addition, different colors are used to show, for each TCM, the percentage of test results corresponding to different failure reasons. The table at the center of the heat map shows combined percentages for all the testing applications.

Figure 5E:
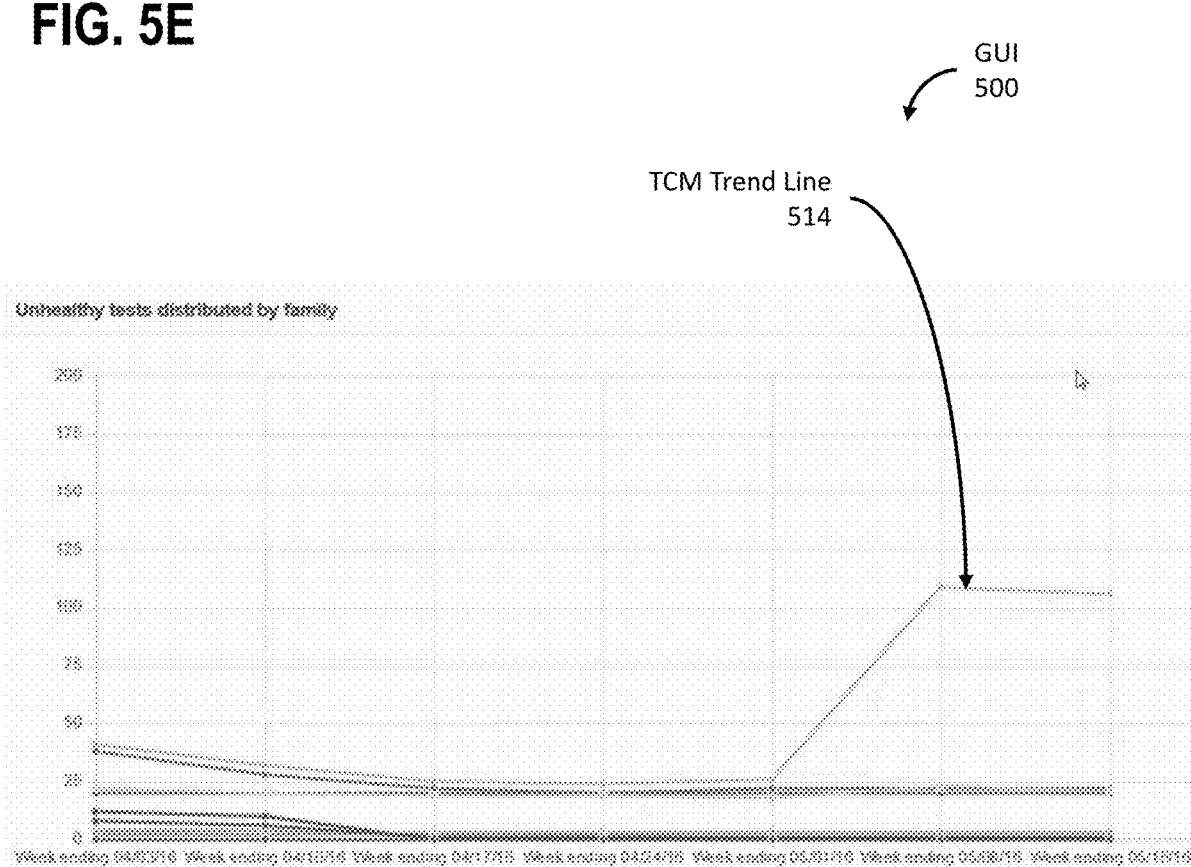

As shown in FIG. 5E, the GUI 500 may present one or more TCM trendlines (e.g., TCM trend line 514). A TCM trend line 514 shows how a TCM has changed, for a particular testing application, over time. In the example shown in FIG. 5E, the trend line represents a number of unhealthy testing applications, i.e., a number of TCMs that have been assigned a confidence category of "unhealthy." A TCM trend line 514 that decreases over time may indicate that problems in the corresponding testing application have been addressed, making the testing application more reliable for testing purposes. In other words, the testing application may be more likely to properly identify problems in the functional code being tested.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
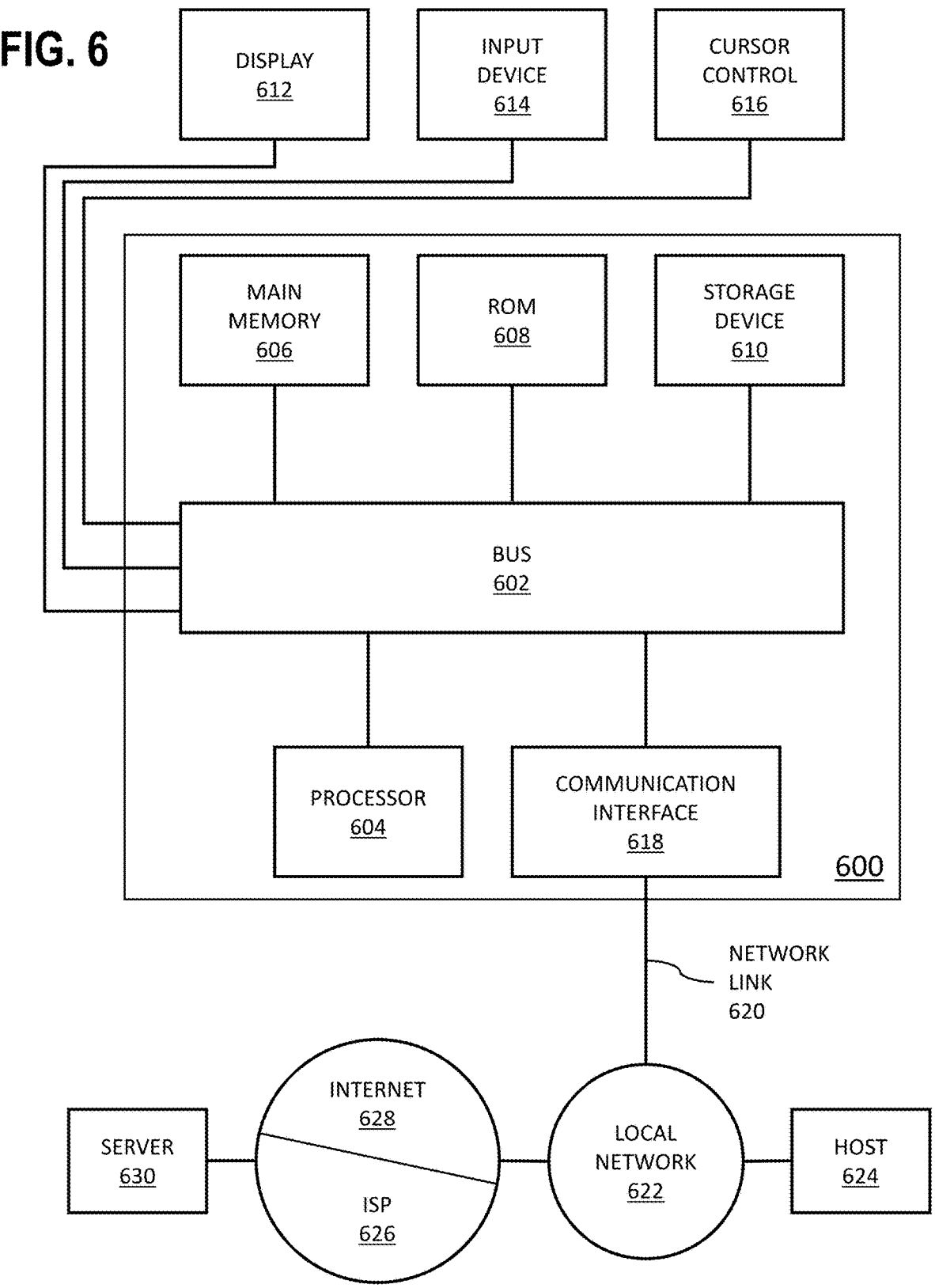
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

9. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

10. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

obtaining a first plurality of test results of a first testing application;

calculating a first test confidence metric for the first testing application based on a first plurality of confidence scores corresponding respectively to the first plurality of test results, wherein calculating a first confidence score in the first plurality of confidence scores comprises:
  (a) identifying a first failure reason for a first test result in the first plurality of test results, wherein the first failure reason indicates a problem in the first testing application;
  (b) determining a first weight corresponding to the first failure reason, wherein the first weight indicates a lower confidence than a second weight for a second failure reason indicating a problem in functional code tested by the first testing application; and
  (c) calculating the first confidence score based on the first weight; and generating, based at least in part on the first test confidence metric, a graphical user interface (GUI) that is indicative of whether the first plurality of test results are relevant to the functional code tested by the first testing application.

2. The medium of claim 1, wherein the operations further comprise:
determining a baseline confidence score per test result in the first plurality of test results,
wherein calculating the first confidence score comprises modifying the baseline score based on the first weight.

3. The medium of claim 2, wherein the operations further comprise:
determining a plurality of time-based damping factors corresponding respectively to the first plurality of test results,
wherein calculating the first confidence score is further based on a corresponding time-based damping factor of the plurality of time-based damping factors.

4. The medium of claim 3, wherein the plurality of time-based damping factors is based on a temporal ordering of the first plurality of test results.

5. The medium of claim 3, wherein for each test result in the plurality of test results, a corresponding time-based damping factor in the plurality of time-based damping factors is based on recentness of the test result.

6. The medium of claim 1, wherein calculating a second confidence score in the plurality of confidence scores comprises:
  (a) determining that a second test result in the first plurality of test results indicates a pass condition of the first testing application,
  (b) determining a third weight corresponding to the pass condition, and
  (c) calculating the second confidence score based on the third weight.

7. The medium of claim 1, wherein the operations further comprise:
obtaining a second plurality of test results of a second testing application; and
calculating a second test confidence metric for the second testing application based on a second plurality of confidence scores corresponding respectively to the second plurality of test results, wherein calculating a second confidence score in the second plurality of confidence scores comprises:
  (a) identifying the second failure reason for a second test result in the second plurality of test results,
  (b) determining the second weight corresponding to the second failure reason, and (c) calculating the second confidence score based on the second weight, wherein the second test confidence metric is different from the first test confidence metric.

8. The medium of claim 1, wherein the GUI indicates, based at least in part on the first test confidence metric, a trend in confidence in the first testing application over time.

9. The medium of claim 8, wherein the GUI comprises a distribution chart of a plurality of test confidence metrics.

10. The medium of claim 1, wherein the operations further comprise:

assigning a confidence category to the first testing application based on the first test confidence metric.

11. The medium of claim 1, wherein the first test confidence metric is calculated based on a sum of the first plurality of confidence scores.

12. The medium of claim 11, wherein the first test confidence metric is calculated by dividing the sum by a maximum possible value.

13. The medium of claim 1, wherein the obtaining the first plurality of test results comprises:

determining a maximum number of test results to be used for calculating the first test confidence metric; and selecting a number of test results not exceeding the maximum number of test results from a plurality of available test results.

14. The medium of claim 1, wherein obtaining the first plurality of test results comprises querying a quality assurance database.

15. The medium of claim 1, wherein determining the first weight comprises selecting a weight corresponding to a problem in the first testing application.

16. The medium of claim 1, wherein determining the second weight comprises selecting a weight corresponding to a problem in functional code tested by the first testing application.

17. The medium of claim 1, wherein the GUI includes a heat map that depicts a visual indicator based on what percentage of the first plurality of test results correspond to the first failure reason.

18. The medium of claim 1, wherein the GUI includes a control for selecting which test confidence metrics to visualize based on groupings of a plurality of testing applications.

19. A system comprising:

one or more hardware processors; and one or more one or more non-transitory computer-readable media storing instructions, which when executed by the one or more hardware processors, cause execution of operations comprising:

obtaining a first plurality of test results of a first testing application;

calculating a first test confidence metric for the first testing application based on a first plurality of confidence scores corresponding respectively to the first plurality of test results, wherein calculating a first confidence score in the first plurality of confidence scores comprises:

(a) identifying a first failure reason for a first test result in the first plurality of test results, wherein the first failure reason indicates a problem in the first testing application;

(b) determining a first weight corresponding to the first failure reason, wherein the first weight indicates a lower confidence than a second weight for a second failure reason indicating a problem in functional code tested by the first testing application; and (c) calculating the first confidence score based on the first weight; and generating, based at least in part on the first test confidence metric, a graphical user interface (GUI) that is indicative of whether the first plurality of test results are relevant to the functional code tested by the first testing application.

20. A method comprising:

obtaining a first plurality of test results of a first testing application;

calculating a first test confidence metric for the first testing application based on a first plurality of confidence scores corresponding respectively to the first plurality of test results, wherein calculating a first confidence score in the first plurality of confidence scores comprises:

(a) identifying a first failure reason for a first test result in the first plurality of test results, wherein the first failure reason indicates a problem in the first testing application;

(b) determining a first weight corresponding to the first failure reason, wherein the first weight indicates a lower confidence than a second weight for a second failure reason indicating a problem in functional code tested by the first testing application; and (c) calculating the first confidence score based on the first weight; and generating, based at least in part on the first test confidence metric, a graphical user interface (GUI) that is indicative of whether the first plurality of test results are relevant to the functional code tested by the first testing application;

wherein the method is performed by at least one device comprising a hardware processor.

* * * * *

UNITED STATES PATENT AND TRADEMARK OFFICE
CERTIFICATE OF CORRECTION

PATENT NO. : 10,558,559 B2
APPLICATION NO. : 15/655095
DATED : February 11, 2020
INVENTOR(S) : Agarwal et al.

Page 1 of 1

It is certified that error appears in the above-identified patent and that said Letters Patent is hereby corrected as shown below:

In the Specification

In Column 11, Line 51, delete "Figures SA-SE" and insert -- FIGS. 5A-5E --, therefor.

In the Claims

In Column 21, Line 47, in Claim 19, delete "one or more one or more" and insert -- one or more --, therefor.

Signed and Sealed this
Third Day of November, 2020

Andrei Iancu
*Director of the United States Patent and Trademark Office*